(12) United States Patent
Holverson

(10) Patent No.: US 11,103,948 B2
(45) Date of Patent: Aug. 31, 2021

(54) SYSTEMS AND METHODS FOR A PERSONALLY ALLOCATED INTERFACE FOR USE IN A WELDING SYSTEM

(71) Applicant: ILLINOIS TOOL WORKS INC., Glenview, IL (US)

(72) Inventor: Todd Earl Holverson, Appleton, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 588 days.

(21) Appl. No.: 14/462,255

(22) Filed: Aug. 18, 2014

(65) Prior Publication Data

US 2016/0045971 A1 Feb. 18, 2016

(51) Int. Cl.
*B23K 9/10* (2006.01)
*G06F 21/35* (2013.01)

(52) U.S. Cl.
CPC ............ *B23K 9/1087* (2013.01); *G06F 21/35* (2013.01)

(58) Field of Classification Search
CPC .............................. B23K 9/1087; G06F 21/35
USPC ......... 219/103.5, 129, 132, 136, 137, 137.7; 428/615; 340/1.1–16.1
See application file for complete search history.

(56) References Cited

U.S. PATENT DOCUMENTS

| | | | |
|---|---|---|---|
| 2,043,331 A | 6/1936 | Robert | |
| 2,175,891 A | 10/1939 | Graham | |
| 2,289,474 A | 7/1942 | Anderson | |
| 2,526,597 A | 10/1950 | Howard | |
| 2,617,913 A | 11/1952 | Sol | |
| 2,642,515 A | 6/1953 | Bagg | |
| 3,567,902 A | 3/1971 | Stearns | |
| 3,992,565 A | 11/1976 | Gatfield | |

(Continued)

FOREIGN PATENT DOCUMENTS

| | | |
|---|---|---|
| CN | 1255684 | 6/2000 |
| CN | 1538306 | 10/2004 |

(Continued)

OTHER PUBLICATIONS

"How to Measure Performance—A Handbook of Techniques and Tools," U.S. Department of Energy, Oct. 1, 1995, http://www.orau.gov/pbm/handbook/handbook_all.pdf.

(Continued)

*Primary Examiner* — Dana Ross
*Assistant Examiner* — Joseph W Iskra
(74) *Attorney, Agent, or Firm* — McAndrews, Held & Malloy, Ltd

(57) ABSTRACT

A welding system having a welding power supply, a wire feeder coupled to the welding power supply, and a welding torch coupled to the wire feeder and configured to output wire from the wire feeder is provided. In particular, the welding system includes a wireless module (e.g., gateway) disposed within a component of the welding system, or as an independent component within the welding system. For example, the wireless module may be disposed within the welding power supply, the wire feeder, or the welding torch. The wireless module is configured to wirelessly transmit to and receive welding information, such as operator identification information, from a wireless personal device. The wireless personal device is uniquely associated with a welding operator operating the welding system.

16 Claims, 4 Drawing Sheets

(56) References Cited

U.S. PATENT DOCUMENTS

| | | |
|---|---|---|
| 4,020,907 A | 5/1977 | Luck |
| 4,051,344 A | 9/1977 | Robbins |
| 4,079,231 A | 3/1978 | Toth |
| 4,093,845 A | 6/1978 | Hairgrove |
| 4,147,919 A | 4/1979 | Matasovic |
| 4,216,367 A | 8/1980 | Risberg |
| 4,216,368 A | 8/1980 | Delay |
| 4,227,066 A | 10/1980 | Bulwidas |
| 4,247,752 A | 1/1981 | Stringer |
| 4,266,114 A | 5/1981 | Hansen |
| 4,410,789 A | 10/1983 | Story |
| 4,450,340 A | 5/1984 | Corrigall |
| 4,467,174 A | 8/1984 | Gilliland |
| 4,484,059 A | 11/1984 | Lillquist |
| 4,508,954 A | 4/1985 | Kroll |
| 4,521,572 A | 6/1985 | Cuscurida |
| 4,521,672 A | 6/1985 | Fronius |
| 4,531,045 A | 7/1985 | Gerrit |
| 4,547,855 A | 10/1985 | Lanyi |
| 4,561,059 A | 12/1985 | Davis |
| 4,584,685 A | 4/1986 | Gajjar |
| 4,641,292 A | 2/1987 | Tunnell |
| 4,716,274 A | 12/1987 | Gilliland |
| 4,767,908 A | 8/1988 | Dallavalle |
| 4,825,038 A | 4/1989 | Smartt |
| 4,998,005 A | 3/1991 | Rathi |
| 5,025,500 A | 6/1991 | Phinney |
| 5,039,635 A | 8/1991 | Stempin |
| 5,039,835 A | 8/1991 | Schwiete |
| 5,043,557 A | 8/1991 | Tabata |
| 5,136,139 A | 8/1992 | Gilliland |
| 5,263,897 A | 11/1993 | Kondo |
| 5,276,305 A | 1/1994 | Hsien |
| 5,376,894 A | 12/1994 | Petranovich |
| 5,406,050 A | 4/1995 | MacOmber |
| 5,426,426 A | 6/1995 | Hymel |
| 5,500,512 A | 3/1996 | Goldblatt |
| 5,651,903 A | 7/1997 | Shirk |
| 5,653,902 A | 8/1997 | Chang |
| 5,708,253 A | 1/1998 | Bloch |
| 5,731,799 A | 3/1998 | Kee |
| 5,889,671 A | 3/1999 | Autermann |
| 5,982,253 A | 11/1999 | Perrin |
| 6,002,104 A | 12/1999 | Hsu |
| 6,040,555 A | 3/2000 | Tiller |
| 6,040,829 A | 3/2000 | Croy |
| 6,087,622 A | 7/2000 | Summers |
| 6,091,048 A | 7/2000 | Lanouette |
| 6,096,994 A | 8/2000 | Handa |
| 6,103,994 A | 8/2000 | Decoster |
| 6,130,407 A | 10/2000 | Villafuerte |
| 6,156,999 A | 12/2000 | Ignatchenko |
| 6,242,711 B1 | 6/2001 | Cooper |
| 6,247,058 B1 | 6/2001 | Miller |
| 6,248,975 B1 | 6/2001 | Lanouette |
| 6,267,291 B1 | 7/2001 | Blankenship |
| 6,365,868 B1 | 4/2002 | Borowy |
| 6,369,952 B1 | 4/2002 | Rallison |
| 6,417,995 B1 | 7/2002 | Wu |
| 6,423,936 B1 | 7/2002 | Reed |
| 6,458,157 B1 | 10/2002 | Suaning |
| 6,476,354 B1 | 11/2002 | Jank |
| 6,479,793 B1 | 11/2002 | Wittmann |
| 6,486,439 B1 | 11/2002 | Spear |
| 6,510,984 B2 | 1/2003 | Blankenship |
| 6,515,251 B1 | 2/2003 | Wind |
| 6,531,673 B2 | 3/2003 | Fedorcak |
| 6,536,660 B2 | 3/2003 | Blankenship |
| 6,552,303 B1 | 4/2003 | Blankenship |
| 6,563,085 B2 | 5/2003 | Lanouette |
| 6,570,132 B1 | 5/2003 | Brunner |
| 6,583,386 B1 | 6/2003 | Ivkovich |
| 6,624,388 B1 | 9/2003 | Blankenship |
| 6,636,776 B1 * | 10/2003 | Barton ............... B23K 9/1062 219/109 |
| 6,700,097 B1 | 3/2004 | Hsu |
| 6,708,877 B2 | 3/2004 | Blankenship |
| 6,710,299 B2 | 3/2004 | Blankenship |
| 6,734,393 B1 | 5/2004 | Friedl |
| 6,750,428 B2 | 6/2004 | Okamoto |
| 6,781,095 B2 | 8/2004 | Hayes |
| 6,797,921 B2 | 9/2004 | Niedereder |
| 6,809,292 B2 | 10/2004 | Spear |
| 6,841,752 B2 | 1/2005 | Ward |
| 6,852,949 B2 | 2/2005 | Lanouette |
| 6,858,817 B2 | 2/2005 | Blankenship |
| 6,906,285 B2 | 6/2005 | Zucker |
| 6,909,285 B2 | 6/2005 | Jordan |
| 6,924,459 B2 | 8/2005 | Spear |
| 7,032,814 B2 | 4/2006 | Blankenship |
| 7,038,167 B2 | 5/2006 | Hayes |
| 7,041,936 B2 | 5/2006 | Oberzaucher |
| 7,045,742 B2 | 5/2006 | Feichtinger |
| 7,089,337 B2 | 8/2006 | Senoo |
| 7,130,255 B2 | 10/2006 | Smith |
| 7,180,029 B2 | 2/2007 | Ott |
| 7,205,503 B2 | 4/2007 | Reynolds |
| 7,220,941 B2 | 5/2007 | Niedereder |
| 7,245,875 B2 | 7/2007 | Clark |
| 7,257,465 B2 | 8/2007 | Perez |
| 7,307,241 B2 | 12/2007 | Hayes |
| 7,336,259 B2 | 2/2008 | Li |
| 7,342,210 B2 | 3/2008 | Fergason |
| 7,363,137 B2 | 4/2008 | Brant |
| 7,369,156 B1 | 5/2008 | Heinke |
| 7,375,304 B2 | 5/2008 | Kainec |
| 7,501,613 B2 | 3/2009 | Fergason |
| 7,510,047 B2 | 3/2009 | Muto |
| 7,510,151 B2 | 3/2009 | Perez-Sanchez |
| 7,523,069 B1 * | 4/2009 | Friedl ............... B23K 9/32 219/78.01 |
| 7,550,689 B2 | 6/2009 | Wech |
| 7,574,172 B2 | 8/2009 | Clark |
| 7,643,890 B1 | 1/2010 | Hillen |
| 7,810,937 B2 | 10/2010 | Garbergs |
| 7,873,495 B2 | 1/2011 | Lindell |
| 7,908,302 B1 | 3/2011 | Nagaralu |
| 7,979,162 B2 | 7/2011 | Niemela |
| 8,338,743 B2 | 12/2012 | Wanner |
| 8,569,655 B2 | 10/2013 | Cole |
| 8,890,031 B2 | 11/2014 | Vogel et al. |
| 9,566,192 B2 * | 2/2017 | Becker ............... G06F 3/005 |
| 2001/0043656 A1 | 11/2001 | Koslar |
| 2002/0099774 A1 | 7/2002 | Yamato |
| 2003/0184515 A1 | 10/2003 | Tsai |
| 2004/0050905 A1 | 3/2004 | Endo |
| 2004/0099648 A1 | 5/2004 | Hu |
| 2004/0199846 A1 | 10/2004 | Matsumoto |
| 2004/0232128 A1 | 11/2004 | Niedereder |
| 2004/0260407 A1 | 12/2004 | Wimsatt |
| 2004/0262279 A1 | 12/2004 | Spear |
| 2005/0002083 A1 | 1/2005 | Fergason |
| 2005/0007504 A1 | 1/2005 | Fergason |
| 2005/0007667 A1 | 1/2005 | Fergason |
| 2005/0016975 A1 | 1/2005 | Reynolds |
| 2005/0017152 A1 | 1/2005 | Fergason |
| 2005/0133488 A1 | 6/2005 | Blankenship |
| 2005/0152294 A1 | 7/2005 | Yu |
| 2005/0155068 A1 | 7/2005 | Chang |
| 2005/0197115 A1 * | 9/2005 | Clark ............... B23K 9/0953 455/426.1 |
| 2005/0205647 A1 | 9/2005 | Wang |
| 2005/0230372 A1 | 10/2005 | Ott |
| 2005/0263511 A1 | 12/2005 | Fosbinder |
| 2005/0263513 A1 | 12/2005 | Leisner |
| 2005/0289264 A1 | 12/2005 | Illowsky |
| 2006/0027980 A1 | 2/2006 | Hiestand |
| 2006/0077046 A1 | 4/2006 | Endo |
| 2006/0138113 A1 | 6/2006 | Ott |
| 2006/0163227 A1 | 7/2006 | Hillen |
| 2006/0207980 A1 | 9/2006 | Jacovetty |
| 2006/0213892 A1 | 9/2006 | Ott |
| 2006/0276288 A1 | 12/2006 | Iwanaka |
| 2007/0056942 A1 | 3/2007 | Daniel |

(56) References Cited

U.S. PATENT DOCUMENTS

| | | | |
|---|---|---|---|
| 2007/0080149 A1* | 4/2007 | Albrecht | B23K 9/10 219/130.01 |
| 2007/0080150 A1 | 4/2007 | Albrecht | |
| 2007/0080151 A1 | 4/2007 | Albrecht | |
| 2007/0080152 A1 | 4/2007 | Albrecht | |
| 2007/0080153 A1* | 4/2007 | Albrecht | B23K 9/10 219/130.01 |
| 2007/0089215 A1 | 4/2007 | Biche | |
| 2007/0114216 A1 | 5/2007 | Ott | |
| 2007/0158319 A1 | 7/2007 | Connally | |
| 2007/0199047 A1* | 8/2007 | Gibart | G06F 21/32 726/2 |
| 2007/0262065 A1 | 11/2007 | Peters | |
| 2008/0003997 A1 | 1/2008 | Parkkinen | |
| 2008/0041553 A1 | 2/2008 | Snyder | |
| 2008/0061049 A1 | 3/2008 | Albrecht | |
| 2008/0078811 A1 | 4/2008 | Hillen | |
| 2008/0116185 A1 | 5/2008 | Luck | |
| 2008/0116186 A1 | 5/2008 | Luck | |
| 2008/0149611 A1 | 6/2008 | Roth | |
| 2008/0149686 A1 | 6/2008 | Daniel | |
| 2009/0013210 A1* | 1/2009 | McIntosh | H04L 41/0672 714/4.1 |
| 2009/0039064 A1 | 2/2009 | Enyedy | |
| 2009/0071949 A1 | 3/2009 | Harris | |
| 2009/0120919 A1 | 5/2009 | O'Donnell | |
| 2009/0152251 A1 | 6/2009 | Dantinne | |
| 2009/0173726 A1 | 7/2009 | Davidson | |
| 2009/0200283 A1 | 8/2009 | Bland | |
| 2009/0234483 A1 | 9/2009 | Leko | |
| 2009/0272221 A1 | 11/2009 | Long | |
| 2009/0272222 A1 | 11/2009 | Long | |
| 2009/0276930 A1 | 11/2009 | Becker | |
| 2009/0298024 A1 | 12/2009 | Batzler | |
| 2009/0313549 A1 | 12/2009 | Casner | |
| 2009/0327035 A1 | 12/2009 | Allard | |
| 2010/0086003 A1 | 4/2010 | Pfitzner | |
| 2010/0217440 A1 | 8/2010 | Lindell | |
| 2010/0224610 A1 | 9/2010 | Wallace | |
| 2010/0257228 A1 | 10/2010 | Staggs | |
| 2010/0299185 A1 | 11/2010 | Caro | |
| 2011/0049116 A1 | 3/2011 | Rappl | |
| 2011/0073569 A1 | 3/2011 | Rappl | |
| 2011/0114615 A1 | 5/2011 | Daniel | |
| 2011/0117527 A1 | 5/2011 | Conrardy | |
| 2011/0172796 A1 | 7/2011 | Sohmshetty | |
| 2011/0180517 A1 | 7/2011 | Schneider | |
| 2011/0198329 A1* | 8/2011 | Davidson | B23K 9/095 219/130.5 |
| 2011/0248008 A1 | 10/2011 | Long | |
| 2011/0316516 A1 | 12/2011 | Schiefermuller | |
| 2012/0026996 A1 | 2/2012 | Yamaguchi | |
| 2012/0065972 A1 | 3/2012 | Strifler | |
| 2012/0136692 A1 | 5/2012 | Ohishi | |
| 2012/0193330 A1 | 8/2012 | Edwards | |
| 2012/0226478 A1 | 9/2012 | Bender | |
| 2012/0265996 A1 | 10/2012 | Kaal | |
| 2013/0075380 A1 | 3/2013 | Albrech | |
| 2013/0085380 A1 | 4/2013 | Velusamy | |
| 2013/0091567 A1 | 4/2013 | Finch | |
| 2013/0094551 A1 | 4/2013 | Ling | |
| 2013/0119036 A1* | 5/2013 | Daniel | B23K 9/095 219/130.21 |
| 2014/0014638 A1 | 1/2014 | Artelsmair | |
| 2014/0027427 A1 | 1/2014 | Fosbinder | |
| 2014/0048522 A1 | 2/2014 | Dina | |
| 2014/0069899 A1 | 3/2014 | Mehn | |
| 2014/0277648 A1 | 9/2014 | Chong | |
| 2014/0277684 A1 | 9/2014 | Lamers | |
| 2014/0278242 A1 | 9/2014 | Lamers | |
| 2014/0278243 A1 | 9/2014 | Lamers | |
| 2015/0012865 A1 | 1/2015 | Lamers | |
| 2015/0019594 A1 | 1/2015 | Lamers | |
| 2015/0121309 A1 | 4/2015 | Reed | |

FOREIGN PATENT DOCUMENTS

| | | |
|---|---|---|
| CN | 1746833 | 3/2006 |
| CN | 1778990 | 5/2006 |
| CN | 1841321 | 10/2006 |
| CN | 2832401 Y | 11/2006 |
| CN | 101341755 | 1/2009 |
| CN | 101360580 | 2/2009 |
| CN | 101374624 A | 2/2009 |
| CN | 201493592 | 6/2010 |
| CN | 101978389 | 2/2011 |
| CN | 102059433 | 5/2011 |
| CN | 102239025 | 11/2011 |
| CN | 102298858 | 12/2011 |
| CN | 102371414 | 3/2012 |
| CN | 102378666 | 3/2012 |
| CN | 102458748 | 5/2012 |
| CN | 102601493 | 7/2012 |
| CN | 102609123 | 7/2012 |
| CN | 102821903 | 12/2012 |
| CN | 102922089 | 2/2013 |
| CN | 103513638 | 1/2014 |
| DE | 19624027 | 12/1997 |
| DE | 19828986 | 12/1999 |
| DE | 202006009014 | 8/2006 |
| EP | 0575082 | 12/1993 |
| EP | 0626635 | 11/1994 |
| EP | 0895826 | 2/1999 |
| EP | 0903195 A1 | 3/1999 |
| EP | 1112800 | 7/2001 |
| EP | 1112800 A1 | 7/2001 |
| EP | 1295673 A1 | 3/2003 |
| EP | 1380377 A2 | 1/2004 |
| EP | 1445055 | 8/2004 |
| EP | 1486283 A1 | 12/2004 |
| EP | 1586403 | 10/2005 |
| EP | 1635508 | 3/2006 |
| EP | 1681122 | 7/2006 |
| EP | 1683599 | 7/2006 |
| EP | 1958738 | 8/2008 |
| EP | 2131145 | 12/2009 |
| EP | 1295673 | 6/2016 |
| GB | 2454232 | 5/2009 |
| JP | 61137675 | 6/1986 |
| JP | 4162964 | 6/1992 |
| JP | 04162964 | 6/1992 |
| JP | 04162966 | 6/1992 |
| JP | H1147950 | 2/1999 |
| JP | 3024700 | 3/2000 |
| JP | 2000176675 | 6/2000 |
| JP | 2001245174 | 9/2001 |
| JP | 2002054494 | 2/2002 |
| JP | 2003069911 | 3/2003 |
| JP | 2003088957 | 3/2003 |
| JP | 2003154455 | 5/2003 |
| JP | 2003191075 | 7/2003 |
| JP | 2003211378 A | 7/2003 |
| JP | 2003236663 | 8/2003 |
| JP | 2003236669 | 8/2003 |
| JP | 4017977 | 12/2007 |
| JP | 2011224661 | 11/2011 |
| JP | 2011255472 | 12/2011 |
| JP | 2013193091 | 9/2013 |
| KR | 20120071189 | 2/2012 |
| KR | 20130001955 | 1/2013 |
| WO | 9958285 | 11/1999 |
| WO | 0134337 | 5/2001 |
| WO | 02058878 A1 | 8/2002 |
| WO | 02085566 | 10/2002 |
| WO | 02086656 | 10/2002 |
| WO | 02095323 A1 | 11/2002 |
| WO | 03028389 | 1/2003 |
| WO | 2008060753 | 5/2008 |
| WO | 2010111722 | 10/2010 |
| WO | 2010142858 | 12/2010 |
| WO | 2011100214 | 8/2011 |
| WO | 2012000650 | 1/2012 |

(56) References Cited

FOREIGN PATENT DOCUMENTS

| WO | 2013184593 | 2/2013 |
|---|---|---|
| WO | 2013184589 | 12/2013 |

OTHER PUBLICATIONS

"Miller PC-300 Owner's Manual", Aug. 1989 (Aug. 1989), http://igor.chudov.com/manuals/Miller/Miller-PC-300-Pulse-Control_Manual.pdf.
Avocent, "LongView Wireless User Guide", 2005, http://site.i-techcompany.com/DataSheet/Avocent/Iv5800UG.pdf.
Echelon, "PL 3120 / PL 3150 Power Line Smart Transceiver Data Book," Version 2, 005-0154-01C.
Gilsinn, Jim et al.: "A Welding Cell That Supports Remote Collaboration", Ninth International Conference on Computer Technology in Welding, Sep. 30, 1999.
Heinrich Hackl et al., 'Digitally Controlled GMA Power Sources,' pp. 1-7.
International Search Report for PCT application No. PCT/US2015/039687, dated Oct. 13, 2015, 11 pgs.
Wireless Universal Serial Bus Specification, Revision 1.0, May 12, 2005.
Intellon, "CEBus Power Line Encoding and Signaling," White Paper #0027, Mar. 1997, Version 0.1, pp. 1-6.
International Search Report from PCT application No. PCT/US2016/068407, dated Feb. 17, 2017, 10 pgs.
Office Action for European Patent Application No. 15751164.3 dated Oct. 19, 2018, 7 pages.

* cited by examiner

SYSTEMS AND METHODS FOR A PERSONALLY ALLOCATED INTERFACE FOR USE IN A WELDING SYSTEM

BACKGROUND

The invention relates generally to the field of welding systems, and more particularly to systems and methods for wireless resources that utilize one or more personally allocated interfaces for facilitating and supporting the welding system.

Welding processes are utilized in virtually all industries, from manufacturing, to power production, to shipbuilding, to maintenance, just to mention a few. Conventional welding systems have operated as stand-alone installations, either fixed in factory or service center settings, or mobile, such as for adaptable manufacturing and field service. In many scenarios, it is increasingly useful to set performance criteria, monitor performance, and/or analyze performance for a particular welding task or job. In some situations, it may be beneficial to associate an operator to the particular welding task or job the operator is performing. In particular, it is increasingly useful to set, monitor, track, and/or analyze operator performance for the particular welding task or job.

Systems designed to associate and/or track an operator with a particular welding system, location, task, or job, however, have not reached a point where they are easily and effectively utilized. For example, in some current systems, a welding operator's identification card is scanned or identification/authenticating information is entered. Accordingly, there is a need for the efficient identification and/or authentication of an operator prior to commencing a welding task or job at a particular welding system or location. Accordingly, improvements in these areas may be beneficial to maintain operator performance and/or retrospectively review operator performance.

BRIEF DESCRIPTION

In one embodiment, a welding system having a welding power supply, a wire feeder coupled to the welding power supply, and a welding torch coupled to the wire feeder and configured to output wire from the wire feeder is provided. In particular, the welding system includes a wireless module (e.g., gateway) disposed within a component of the welding system, or as an independent component within the welding system. For example, the wireless module may be disposed within the welding power supply, the wire feeder, or the welding torch. The wireless module is configured to wirelessly transmit to and receive welding information, such as operator identification information, from a wireless personal device. The wireless personal device is uniquely associated with a welding operator operating the welding system.

DRAWINGS

These and other features, aspects, and advantages of the present invention will become better understood when the following detailed description is read with reference to the accompanying drawings in which like characters represent like parts throughout the drawings, wherein.

Figure 2:
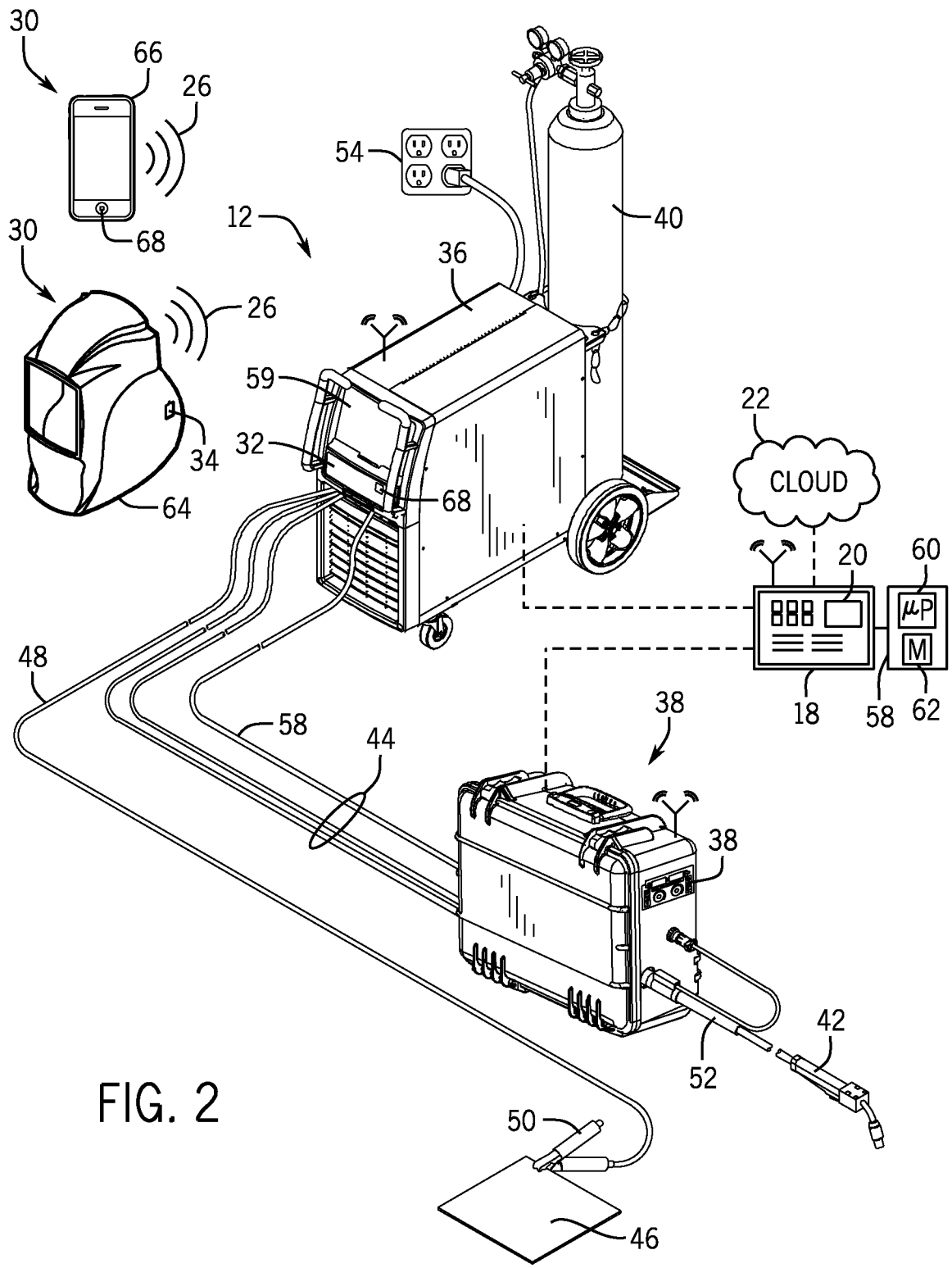
FIG. 2 is an embodiment of the welding system of FIG. 1 in wireless communication with one or more personally allocated devices, in accordance with aspects of the present disclosure.
Figure 3:
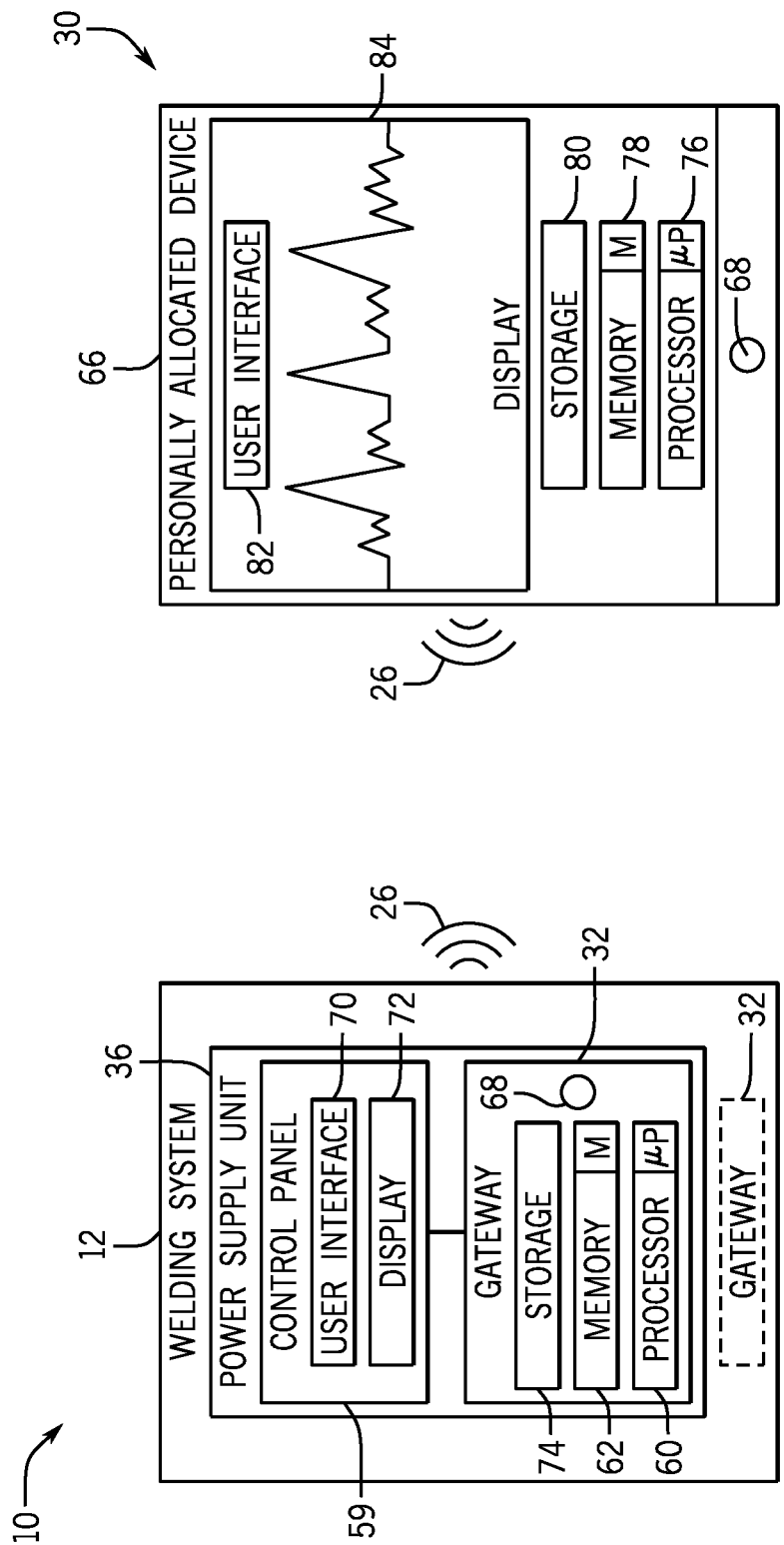
Figure 4:
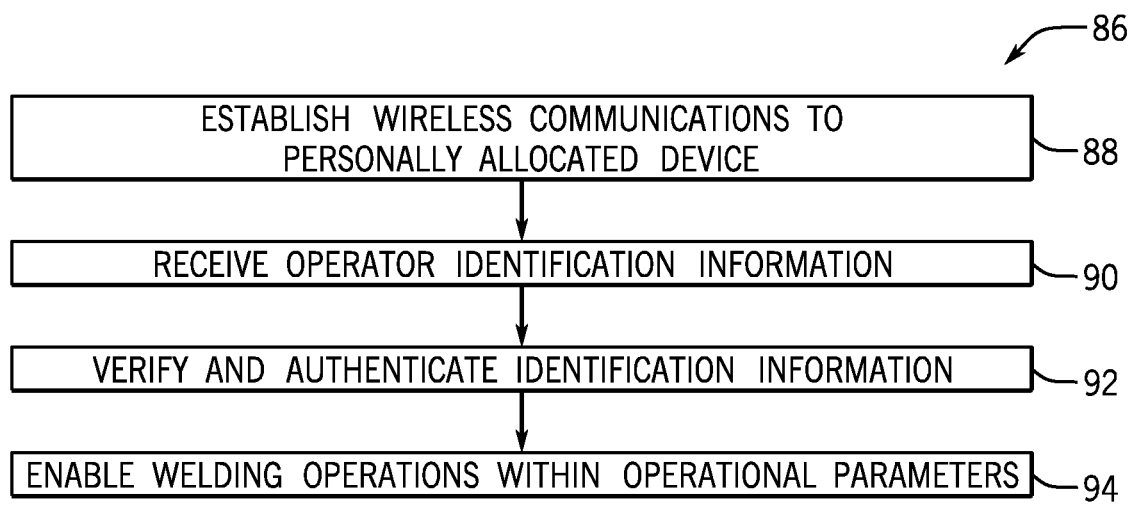

FIG. 3 is a block diagram of an embodiment of a wireless communications channel established between the personally allocated device of FIG. 2 and a gateway disposed within the welding system of FIG. 2, in accordance with aspects of the present disclosure; and FIG. 4 is a flow chart of an embodiment of a method for enabling welding operations on the welding system of FIG. 2 for a particular operator, in accordance with aspects of the present disclosure.

DETAILED DESCRIPTION

While only certain features of the invention have been illustrated and described herein, many modifications and changes will occur to those skilled in the art. It is, therefore, to be understood that the appended claims are intended to cover all such modifications and changes as fall within the true spirit of the invention.

Embodiments of the welding system described herein may include one or more personally allocated devices having wireless capabilities (e.g., smart phone, tablet, notepad, helmet, audio input device, personal clothing, tags, laptop, etc.) that are personally allocated to a welding operator. In particular, the personally allocated device may include information that is captured by the welding system to identify and/or authenticate the welding operator. As explained in greater detail below, the personally allocated device may be configured to wirelessly communicate with one or more components of the welding system, such as a wireless module or gateway. In certain embodiments, the personally allocated device may establish wireless communications with the wireless module or gateway with one or more different binding processes, as further detailed below. In other embodiments, the personally allocated device may establish more direct wireless communications with the wireless module or gateway via one or more different wireless communications standards, as further described below. Once wireless communications is securely established, the paired devices may transfer various welding related information, such as operator identification information.

In certain embodiments, the welding operator may be automatically identified via the personally allocated device when the operator is proximate to the welding system. Further, upon identification, the welding system may be configured to authenticate the operator for a particular welding system, location, or task. In some situations, the welding system may load an operator profile corresponding to the welding operator, which may, for example, have pre-set parameters that limit the operator's functions. In particular, the welding system may monitor and track operator performance, which may be communicated to a cloud storage or service. Furthermore, in certain embodiments, the personally allocated device may be utilized by the operator to view data, determine current settings or parameters, control one or more welding parameters, control a power source, determine deficiencies or configuration problems, troubleshoot, and so forth.

Figure 1:
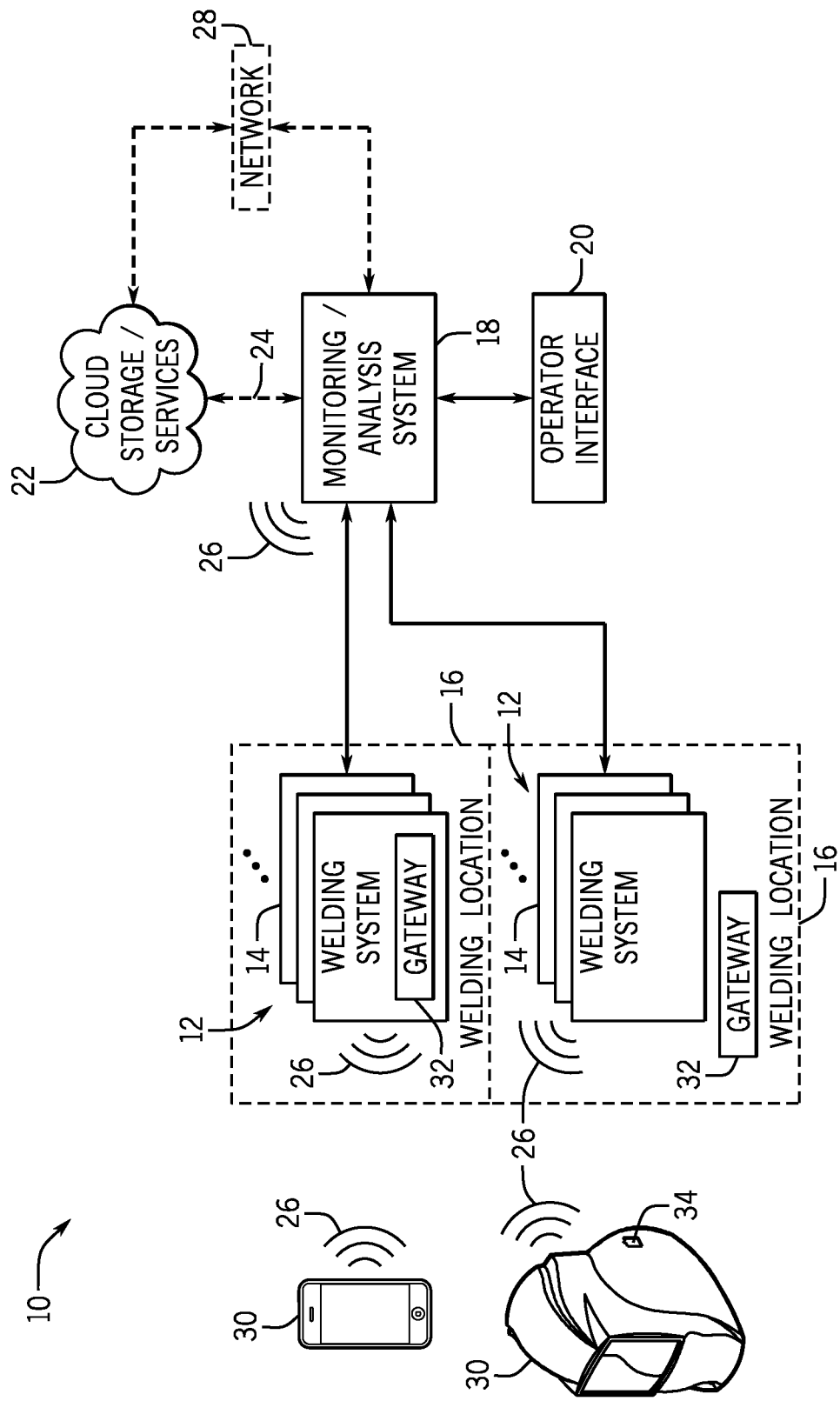
FIG. 1 is a diagrammatical representation of an embodiment of a cloud-based welding system in accordance with aspects of the present disclosure.

Turning now to the drawings, FIG. 1 illustrates an embodiment of a cloud-based welding system 10 in accordance with aspects of the present disclosure. The system 10 may include one or more welding systems 12, which may be physically and/or analytically grouped together as indicated generally by reference numeral 14. In the illustrated embodiment, the welding systems 12 may be further grouped into different welding locations 16. Indeed, as will be appreciated by those skilled in the art, in sophisticated manufacturing and fabrication entities, different locations, facilities, factories, plants, and so forth may be situated in various parts of the same country, or internationally. The present techniques allow for collection of system data, and in particular welding operator data (e.g., operator performance data), from all such systems regardless of their welding location 16.

In certain embodiments, the system 10 includes a monitoring/analysis system 18 that communicates with the welding systems 12 (and any ancillary support equipment) to collect information. For example, the welding systems 12 include sensors, control circuitry, feedback circuits, and so forth that allow for the collection of welding parameter data. In some situations, system parameters such as arc on time are analyzed and collected, and may reflect when welding arcs are established in times during which welding arcs are maintained. In addition, currents and voltages will commonly be sensed and data representative of these will be stored. Additionally, the monitoring/analysis system 24 may collect information directly from other systems or from other support components within the system 10 that collect and store the data. The data will typically be tagged with such identifying information as system designations, system types, time and date, part and weld specification, where applicable, operation identifications, and so forth. In addition, the data may be tagged to identify the welding operator associated with the data collected.

The system 10 includes a cloud 22, which may refer to various evolving arrangements, infrastructure, networks, and the like that will typically be based upon the Internet. The term may refer to any type of cloud, including a client clouds, application clouds, platform clouds, infrastructure clouds, server clouds, and so forth. As will be appreciated by those skilled in the art, such arrangements will generally allow for third party entities to receive and store data related to welding applications, transmit data to welders and entities in the welding community for welding applications, provide software as a service (SaaS), provide various aspects of computing platforms as a service (PaaS), provide various network infrastructures as a service (IaaS) and so forth. Moreover, included in this term should be various types and business arrangements for these products and services, including public clouds, community clouds, hybrid clouds, and private clouds. Any or all of these may be serviced by third party entities. Moreover, servicing by third party entities is particularly attractive in many contexts because resources discussed below can provide products and services that are otherwise unavailable to the welding community. However, in certain embodiments, particularly large entities with distributed manufacturing operations, private clouds or hybrid clouds may be attractive to allow for sharing of welding-relating product and services across the enterprise.

The cloud 22 may be configured for two-way communications with components of the system 10, such as to the monitoring/analysis system 18. In certain embodiments, various wired connections 24 may be utilized for such communications, and may include conventional telephony systems, cable systems, hardware-based Internet communications systems, including routers, servers, gateways, and any other hardware, software, and firmware required with such communications. In some embodiments, various wireless connections 26 (e.g., wireless communications) may be utilized, and may include cellular communications, various wireless protocols, satellite communication, and the like. Further, in some situations, the cloud 22 may communicate to a network 28, which may be configured to receive and transfer information from a plurality of monitoring/analysis systems 18 within one or more systems 10. As noted above, communications between the cloud 22 and the network 28 may be wired or wireless, or may include various intermediate devices, such as desktop and portable computers, hand-held computing devices, cellular and smart telephones, and so forth.

The system 10 allows for the grouping, analysis, and presentation of the information collected by the monitoring/analysis system 18 on one or more operator interfaces 20. In many cases the operator interface 20 may comprise a conventional computer workstation, a handheld device, a tablet computer, or any other suitable interface. A number of different device platforms may be accommodated on the operator interface 20, and webpages containing useful interfaces, analysis, reports, and the like will be presented in a general purpose interface, such as a browser. A wide range of information may be processed through the operator interface 20, such as welding job/work order identification, machine performance feedback to the operator, alerts to the operator, operator inputs, barcodes (e.g., barcodes of materials, work orders, or other identifiers), and so forth. In particular, the system 10 may include identification, verification, and authentication features, such as prompting the operator (e.g., user) for user names, passwords, and so forth, via the operator interface 20. The identification, verification, and authentication features may be provided to the system 10 by the operator via the operator interface 20. In some embodiments, such as those detailed below, identification information associated with the welding operator may be automatically captured by the system 10.

For example, in certain embodiments, one or more personally allocated devices 30 may be configured to establish wireless communications 26 (e.g., wireless communications channel) with the welding system 12. The personally allocated device 30 may be any device that is associated with a particular welding operator, such as a smart phone, a tablet, a notepad, a welding helmet, an audio input device, a personal clothing item, a personal welding clothing item, an employee tag, a laptop, a personal welding tool, or any item or device that may be configured with wireless capabilities. In particular, the personally allocated device 30 may be configured to wirelessly communicate with one or more components of the welding system, such as a wireless module 32 or a gateway 32 disposed within a particular welding system 12 or location 16, to exchange welding related information. For example, certain personally allocated devices 30 may be configured with a wireless module 34 to wirelessly communicate with the gateway 32. Other personally allocated devices 30, such as a smart phone or a tablet, may be pre-configured with wireless capabilities.

In some embodiments, the personally allocated devices 30 may automatically establish wireless communications 26 (e.g., wireless communication data and/or authentication channels) with the gateway 32 to enable an exchange of information. The channel 26 may be established using any suitable protocol when the device 30 is proximate to the gateway 32 (e.g., within a particular range, distance, or radius). For example, wireless communications may be established using the IEEE 802.15.4 standard, and may be, for example, ZigBee, WirelessHART, or MiWi protocols. Additionally or alternatively, wireless communications may be established using the Bluetooth standard, one or more of the IEEE 802.11 standards, an ultra-wideband (UWB) standard, or a near-field communication (NFC) standard. In certain embodiments, the personally allocated device 30 may establish wireless communications 26 (e.g., wireless communication data and/or authentication channels) with the gateway 32 when a binding or pairing process is activated to enable an exchange of information, as further described in detail with respect to FIG. 2.

Upon either automatically or actively establishing wireless communications between the personally allocated device 30 and the gateway 32, identification information corresponding to the operator may be transferred, which the system 10 may use to verify and authenticate the operator. For example, in certain embodiments, the monitoring/analysis system 18 or the cloud 22 may include a plurality of profiles, where each profile corresponds to a different user or operator. In some situations, the user profile associated with that operator may be locally loaded and displayed, and may include information related to operational parameters, permissions, or limitations set for the operator. In this manner, the system 10 may be configured to enable or disable one or more functions of the welding operator (e.g., limit operational functionalities of the welding operator) based on the permissions allocated to the operator for that particular welding system 12, location 16, experience level, welding task/job, or any other factor. In some embodiments, the operator's functions during a particular welding task/job are monitored and tracked, and the data collected during this period may be associated with the user profile of the operator. Indeed, after an initial authentication and verification of the operator, other forms of welding related information may be transmitted via the wireless communications 26, as further explained below with respect to FIG. 3

In some situations, the data collected may be stored in a remote location (e.g., the cloud 22 or the monitoring/analysis system 18) with a tag associating the data to a user profile. In such situations, the data collected may be automatically transferred to the cloud 22. Alternatively, in some situations, the data collected may be stored locally at the gateway 32 if communications to the cloud 22 are unavailable via the network 28 or the monitoring/analysis system 18, and may be transferred to the cloud 22 (or other storage devices) at a later time. It should be noted that data associated with a particular operator may be monitored and tracked during the operation, or may be retrieved and analyzed to measure operator performance at a later time.

FIG. 2 is an embodiment of the welding system 12 of FIG. 1 in wireless communication with one or more personally allocated devices 30 in accordance with embodiments of the present disclosure. It should be appreciated that, while the welding system 12 described herein is specifically presented as a gas metal arc welding (GMAW) system 12, the embodiments described therein may also be utilized with other arc welding processes (e.g., FCAW, FCAW-G, GTAW (TIG), SAW, SMAW) or other welding processes (e.g., friction stir, laser, hybrid). The welding system 12 includes a welding power supply unit 36 (i.e., a welding power source), a welding wire feeder 38, a gas supply system 40, and a welding torch 42. The welding power supply unit 36 generally supplies power to the welding system 12 and other various accessories, and may be coupled to the welding wire feeder 38 via a weld cable 44. The welding power supply unit 36 may also be coupled to a workpiece 46 using a lead cable 48 having a clamp 50. In the illustrated embodiment, the welding wire feeder 38 is coupled to the welding torch 42 via a weld cable 52 in order to supply welding wire and power to the welding torch 42 during operation of the welding system 12. In another embodiment, the welding power supply unit 36 may couple and directly supply power to the welding torch 42.

In the embodiment illustrated in FIG. 2, the welding power supply unit 36 may generally include power conversion circuitry that receives input power from an alternating current power source 54 (e.g., the AC power grid, an engine/generator set, or a combination thereof), conditions the input power, and provides DC or AC output power via the weld cable 44. As such, the welding power supply unit 36 may power the welding wire feeder 38 that, in turn, powers the welding torch 42, in accordance with demands of the welding system 12. The lead cable 48 terminating in the clamp 50 couples the welding power supply unit 36 to the workpiece 46 to close the circuit between the welding power supply unit 36, the workpiece 46, and the welding torch 42. The illustrated welding system 12 includes a gas supply system 40 that supplies a shielding gas or shielding gas mixtures to the welding torch 42. In the depicted embodiment, the gas supply system 40 is directly coupled to the welding torch 42 via a gas conduit 56 that is part of the weld cable 44 from the welding power supply unit 36.

In certain embodiments, the operator interface 20 may be incorporated with the monitoring/analysis system 18, and may be configured to receive a user input to determine a weld process, a weld application, an operator identification or authentication, etc. A controller 58 utilizes a processor 60 to execute instructions loaded to the monitoring/analysis system 18 and/or stored into a memory 62 to determine the weld process and/or the weld variables. For example, in certain embodiments, the monitoring/analysis system 18 may load a user profile associated with a particular operator, and may limit the operational functionalities of the operator based on the user profile. In particular, as noted above with respect to FIG. 1, the monitoring/analysis system 18 is configured to receive information (e.g., welding operator identification information) from the gateway 32, which may be configured as a component of the system 10.

For example, in the illustrated embodiment, the gateway 32 may be incorporated into the welding power supply unit 36. In some situations, the gateway 32 may be disposed proximate to a welding control panel 59 on the welding power supply unit 36, which may include a display and/or a human machine interface that displays information related to the gateway 32 (e.g., status, connectivity, etc.). In other embodiments, the gateway 32 may be incorporated into the wire feeder 38, or may be a standalone component of the welding system 12. As noted above with respect to FIG. 1, the gateway 32 may comprise a wireless module capable of establishing wireless communications 26 (e.g., wireless communications channel) with the personally allocated device 30 in order to enable the exchange of welding related information, such as operator identification information. In certain embodiments, the gateway 32 automatically detects when the personally allocated device 30 is within a pre-set and/or target range (e.g., distance) and automatically establishes wireless communications 26 via one or more suitable standards (as described above with respect to FIG. 1). For example, a welding helmet 64 associated with a particular user or operator may automatically establish wireless communications 26 with the gateway 32 when the operator and/or the welding helmet 64 is proximate (e.g., near) the welding system 12. The distance or range of activation may be based on different parameters, such as the type of wireless communication, the specification of the device 30 or the gateway 32, the strength of the wireless signal, a preset value, and so forth.

In some embodiments, the gateway 32 and the personally allocated device 30 establish wireless communications 26 via a binding or pairing process. The binding/pairing process involves activating the association between the gateway 32 and the personally allocated device 30 in order to establish wireless communications 26, thereby securely enabling the exchange of welding related information. For example, in some situations, a personally allocated device 30, such as a computing device 66 (e.g., smartphone, iPad, portable electronic device, etc.) associated with a particular user or operator, may scan a barcode disposed on the welding system 12, such as a barcode disposed on the power supply unit 36, the wire feeder 38, the gas supply system 40, the welding torch 42, and so forth. Likewise, a unique serial number associated with a component of the welding system 12 may be entered into the computing device 66 to activate the association between the gateway 32 and the computing device 66. Further, in some situations, the binding process may be activated simultaneously at the gateway 32 and the personally allocated device 30 via an activation feature 68 (e.g., activation button 68). In this example, the operator may trigger the feature 68 (e.g., activation button 68) on the gateway 32 at the same time that a feature 68 of the personally allocated device 30 is triggered. Triggering the two devices approximately simultaneously may activate the binding process, and allow the devices to recognize each other to establish wireless communications 26. As a further example, in some situations, a feature 68 of the personally allocated device 30 or the gateway 32 may be triggered first. The triggered device begins to search for the complementary device, at which point a feature 68 on the complementary device 30 or complementary gateway 32 is triggered to activate the binding process.

In certain embodiments, the binding and/or pairing process involves a helmet as the personally allocated device 30. For example, when the auto-darkening feature of a helmet is activated with 90% synchronization with the Arc On/Off signals from the power supply unit 36, a binding and/or pairing association may be made between the particular helmet in use and the gateway 32 disposed within the power supply unit 36. In some situations, if two helmets are within a pairing range, the helmet that establish a binding or pairing process with the gateway 32 may be the helmet that auto-darkens in-synch with the power supply unit 36. It should be noted that in some situations, redundancy may be a way to increase confidence in the collected information. For example, if two or more devices allocated to one operator are in the work area, it is more probable that this operator is the person in this work area. Even if another personally allocated device is in the area, the system may determine the correct operator is the one with the highest number of personally allocated devices reporting. Another example, the gateway 32 may be configured to recognize personally allocated devices 30 that are frequently and/or repeatedly used. Accordingly, the gateway 32 may include intelligence that allows it to more likely establish a pairing with frequently and/or repeatedly used personally allocated devices 30 rather than a personally allocated device 30 with less historical significance. For example, in a situation where a previously used helmet is within the welding area and has on/off synchronization, if another personally allocated device 30, such as, for example, protective clothing, Smartphone, or HMI, was also proximate to the gateway 32, then the personally allocated device 30 that establishes the communications may be the helmet that has made a previous binding or pairing. Indeed, redundancy may help the gateway 32 weed through a plurality of devices 30 by analyzing the historical backlog of previous communications, and/or the personally allocated device 30 that is more secure (e.g., greater confidence in the identification of the operator).

As noted above, once wireless communications 26 is established between the gateway 32 and the personally allocated device 30, welding related information may be exchanged between the two devices. For example, the gateway 32 may receive identification information that corresponds to the particular user or operator the personally allocated device 30 is associated with. Further, as noted above, the monitoring/analysis system 18 and/or the cloud 22 may utilize the identification information to retrieve a user profile associated with that operator. However, it should be noted that in some embodiments, a user profile may be unavailable or non-existent. In such circumstances, the monitoring/analysis system 18 may still correlate, store, or tag any data gathered during operation of the system 10 to the operator with a unique identification number associated with the device 30, an IP address associated with the device 30, a unique employee ID, etc.

FIG. 3 is a block diagram of an embodiment of the wireless communications 26 established between the personally allocated device 30 of FIG. 2 and the gateway 32 disposed within the welding system 12 of FIG. 2, in accordance with aspects of the present disclosure. In the illustrated embodiment, the gateway 32 is disposed within the power supply unit 36 of the welding system 12. However, it should be noted that in other embodiments, the gateway 32 may be disposed anywhere within the welding system 12, such as within other components of the welding system 12 or as an independent component. As noted above, wireless communications 26 is used to exchange information between the welding system 12 and the personally allocated devices 30, where each personally allocated device 30 corresponds to a particular welding user or operator. Further, as noted above, the wireless communications 26 is either automatically established when the device 30 is within the range of the gateway 32, or may be activated to be established via the activation binding or pairing process (as noted above with respect to FIG. 2).

As illustrated, the welding system 12 includes the power supply unit 36 having the welding control panel 59. In some embodiments, the welding control panel 59 includes a user interface 70 through which a user may choose a process or input desired welding parameters. The control panel 59 may receive inputs via the user interface 70 using a keypad, keyboard, buttons, touch screen, voice activation system, etc. Further, the control panel 59 includes a display 72 for presenting, showing, or indicating, welding related information to an operator. For example, the control panel 59 may display the status (e.g., connected, weak signal, strong signal, disconnected, available devices 30 for connection, etc.) of the wireless connection (e.g., wireless communications channel 26) between the gateway 32 and the personally allocated device 30. Further, the control panel 59 may provide a selection of devices 30 that are within a range of the gateway 32, so that the user may select the corresponding personally allocated device 30 via user interface 70. The selected device 30 may be utilized to establish the wireless connection channel 26. In this manner, the operator may be sure that the desired device 30 is operatively coupled to the welding system 12, and that welding related information transmitted between the devices is from the intended source.

The gateway 32, whether disposed within the power supply unit 36, another component of the welding system 12, or as an independent component of the welding system 12, utilizes the processor 60 to execute instructions loaded to the gateway 32, received from the monitoring/analysis system 18, and/or stored into a memory 62. In particular, the gateway 32 may contain additional storage 74 where operating data collected by the welding system 12 is stored locally until it is transferred to the monitoring/analysis system 18, the network 28, and/or the cloud 22 at a later time.

As noted above, the personally allocated device 30 may be any device that is associated with a particular welding operator, such as a smart phone, a tablet, a notepad, a welding helmet, an audio input device, a personal clothing item, a personal welding clothing item, an employee tag, a laptop, a welding glove, a personal welding tool, or any item or device that may be configured with wireless capabilities. In some embodiments, the personally allocated device 30 may be any device that may be configured with a radio-frequency identification (RFID) tag. In certain embodiments, the personally allocated device 30 is a computing device 66 (e.g., smartphone, iPad, portable electronic device, etc.) that includes at least one processor 76, a memory device 78, and a storage device 80. Each of these devices may incorporate features of similar devices previously described. Further, the computing device 66 also includes a user interface 82 for providing inputs to and/or receiving outputs from the computing device 66. For example, the user interface 82 may be disposed on or may be utilized with a display 84 for displaying data, video, etc.

During welding operations, the computing device 66 may be utilized for a variety of purposes. For example, as described above, the computing device 66 may be associated with a particular operator, so it may be utilized to establish wireless communications 26 to the welding system 12 and transfer welding related information, such as identification information corresponding to the operator. Upon receiving the identification information, the welding system 12 may identify and authorize the operator for certain welding operations or tasks. In some embodiments, a user profile may be retrieved from the cloud 22, the network 28, and/or the monitoring/analysis system 18, where the user profile corresponds to the operator. Accordingly, the welding system 12 may limit the operations of the operator based on the permissions allocated to the operator. The user profile, the limitations, the permissions, and generally any other information related to the operator may be displayed on the display 84 of the computing device 66.

Further, once wireless communications 26 is established, other forms of welding related information may be transmitted between devices. In some situations, the data from a welding operation performed by the operator may be logged by the welding system 12 and/or the computing device 66. The logged data may be correlated to the operator via the computing device 66 (e.g., the personally allocated device 30), and may be transferred to the monitoring/analysis system 18 or the cloud 22 for further processing and/or analysis. In some situations, operator performance may be determined by the logged data. Further, in some situations, welding parameters being utilized by the operator may be monitored by a third party during the welding operation, and the operator may be altered or informed if the welding parameters are outside of desired boundaries via the computing device 66. For example, a number of audio and/or visual alerts or alarms may be triggered by a third party monitoring the data received at the monitoring/analysis system 18 or the cloud 22 and received by the operator via the computing device 66.

In particular, in some embodiments, the personally allocated device 30 (e.g., computing device 66) may include a welding application stored within the memory 78 of the computing device 66. The welding application may be a set of executable instructions stored within the memory 78 and executed by the processor 76. The welding application may be selected by the operator using the user interface 82, and the welding application may be utilized to perform the functionalities of the personally allocated device 30 described above. For example, the welding operator may engage the welding application (e.g., via voice activation, touch screen, buttons, keyboard, keypad, etc.) to perform a wide variety of activities, such as establishing wireless communications 26 (e.g., wireless communications channel), transferring welding related information, activating the binding or pairing process, logging data corresponding to an operator or component of the welding process such as a consumable or the part to be welded, transferring identification information correlating to the operator, authenticating the operator, providing user profile information on the display 84, providing welding operations limitations and/or permissions on the display 84, providing information related to the welding parameters, solicit input from the operator, etc.

In particular, in certain embodiments, the welding application may additionally be utilized as a controller to control various components and parameters of the welding system 12. For example, the welding operator may engage the welding application on the personally allocated device 30 prior to commencing a welding operation, establish wireless communications 26 to a gateway 32 of the welding system to enable the exchange of information, and commence the welding operations within the designated operating parameters and permissions allocated to the operator. Once the welding operations commence, the operator can control various welding parameters (e.g., voltage output, current output, a wire feed speed, pulse parameters, etc.) from the personally allocated device 30 via one or more controls signals, as can be appreciated by one skilled in the art. For example, the operator may wirelessly adjust one or more welding parameters of the welding system 12 from a remote location (e.g., a location removed from the welding system 12, but within the operational range of the gateway 32). The adjustments may be preferences on the welding application that the operator may easily control, and may be provided to the device 30 via the user interface 82, as can be appreciated by one skilled in the art. Further, the device 30 may transmit the operator's changes/adjustments of the welding parameters as control signals to the welding system 12.

It should be noted that a plurality of personally allocated devices 30 may be within the range of the gateway 32 of the welding system 12. Accordingly, the welding application on the personally allocated device 30 may be configured to control the welding system 12 that has established wireless communications 26 (e.g., devices that have been securely paired via the binding process). In this manner, the operator may securely control welding parameters from a remote location via the welding application.

FIG. 4 is a flow chart of an embodiment of a method 86 for enabling welding operations on the welding system 12 of FIG. 2 for a particular operator, in accordance with aspects of the present disclosure. The welding system 12, and more particularly, the gateway 32 disposed within the welding system 12, establishes the wireless communications 26 with the personally allocated device 30 (block 88). As noted above, the personally allocated device 30 is any device that is associated with a particular welding operator, such as a smart phone, a tablet, a notepad, a welding helmet, an audio input device, a personal clothing item, a personal welding clothing item, an employee tag, a laptop, a personal welding tool, any item or device configured with an RFID tag, or any item or device that may be configured with wireless capabilities. Further, as noted above, wireless communications 26 may be established automatically or through an active binding/pairing process.

Once wireless communications 26 is established, welding related information may be transmitted between the paired devices. Accordingly, in some embodiments, the personally allocated device 30 may transfer operator identification information that identifies the operator associated with the device 30, and the welding system 12 receives the same (block 90). The identification information may be utilized by the system 10 to identify, verify, and authenticate the operator (block 92). For example, in some situations, the identification information received may be compared to the local or remote database to determine access settings. Further, in some embodiments, the identification information may be used to retrieve a user profile from the monitoring/analysis system 18 or the cloud 22 that corresponds to the operator. The access settings or permissions/limitations may be predetermined and stored within the monitoring/analysis system 18 and/or the cloud 22, and may be based on a number of factors, such as the welding system 12 in question, the location 16 of the welding task, the experience level of the operator, the welding task/job, material to be welded, consumables allocated for this job, and so forth.

Based on the access settings allocated for the particular operator and/or based on the permissions or limitations allocated to the operator, the system 10 may be configured to enable welding operations for the operator within particular boundaries (block 94). In this manner, the welding system 12 may limit the operational functionalities of the welding operator based on the authentication process.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method, comprising:
   detecting that a plurality of wireless personal devices are within a communication range of a wireless module disposed within a welding component of a welding system, the plurality of wireless personal devices being associated with one or more welding operators;
   identifying a particular welding operator that is associated with a greater number of the plurality of wireless personal devices than any other welding operator of the one or more welding operators;
   determining a set of operational parameters within which the particular welding operator may operate the welding system;
   enabling operation of the welding system for the particular welding operator within the determined set of operational parameters;
   collecting welding information from feedback sensors during operation of the welding system; and
   storing the welding information in a memory storage, wherein the welding information is associated with the particular welding operator operating the welding system when stored.

2. The method of claim 1, further comprising establishing wireless communications between a wireless personal device that is associated with the particular welding operator and the wireless module.

3. The method of claim 2, wherein the plurality of wireless personal devices includes the wireless personal device.

4. The method of claim 2, further comprising receiving operator identification information relating to the particular welding operator from the wireless personal device, the operational parameters determined based at least in part on the operator identification information.

5. The method of claim 4, further comprising verifying the operator identification information to authenticate the particular welding operator, wherein authenticating the particular welding operator comprises comparing the operator identification information to information associated with a plurality of welding operators stored in local memory storage or remote cloud-based memory storage.

6. The method of claim 1, wherein the one or more welding operators includes the particular welding operator, and the plurality of wireless personal devices comprise one or more welding gloves, clothing items, glasses, watches, or welding tools.

7. A welding system, comprising:
   a welding power supply comprising a wireless module configured to:
      identify a welding helmet based on a degree of synchronization between an auto-darkening feature of the welding helmet and an arc welding process of the welding power supply,
      establish communication with the welding helmet,
      wirelessly receive operator identification information from the welding helmet, the operator identification information relating to a particular welding operator operating the welding power supply; and
   a monitoring system configured to collect welding feedback data during operation of the welding power supply, store the welding feedback data in memory storage, and associate the particular welding operator with the welding feedback data in the memory storage.

8. The welding system of claim 7, wherein the degree of synchronization comprises 90% synchronization.

9. The welding system of claim 7, further comprising:
   control circuitry configured to retrieve a user profile corresponding to the particular welding operator from the memory storage based on the operator identification information, wherein the welding feedback data is associated with the user profile in the memory storage when the welding feedback data is stored in the memory storage.

10. The welding system of claim 9, wherein the user profile comprises a set of operational permissions that limits functionality of the welding system.

11. The welding system of claim 7, wherein the welding feedback data comprises data relating to a welding process, a welding current, a welding voltage, a workpiece identification, a time of a welding operation, or a location of the welding operation.

12. The welding system of claim 7, wherein the wireless module is configured to identify the welding helmet from a plurality of welding helmets.

13. A method, comprising:
   establishing wireless communications between: a wireless module that is disposed within a welding component, and a first wireless personal device that is associated with first operator identification information;
   establishing wireless communication between the wireless module and a second personal device that is associated with second operator identification information;
   receiving the first operator identification information and the second operator identification information at the wireless module;

identifying a particular welding operator associated with both the first operator identification information and the second operator identification information;
receiving operator inputs relating to operational parameters of the welding system from the first or second wireless personal device;
controlling a welding operation of the welding system based at least in part on the particular welding operator and the received operator inputs;
collecting welding feedback data pertaining to the welding operation;
associating the welding feedback data with a tag representative of the particular welding operator; and
storing the welding data.

14. The method of claim 13, wherein the wireless module comprises a gateway and the first wireless personal device or second wireless personal device comprises a welding helmet having a wireless communication device.

15. The method of claim 4, wherein determining the set of operational parameters is further based on one or more of a location of the welding system or an experience level associated with the particular welding operator.

16. The welding helmet of claim 13, wherein the wireless communications are via an IEEE 802.15.4 standard, ZigBee, WirelessHART, MiWi, Bluetooth, IEEE 802.11 standard, ultra-wideband (UWB) standard, or a near-field communication (NFC) standard protocol.

* * * * *